No. 647,006. Patented Apr. 10, 1900.
A. MAGGIORANI.
SPECIAL APPARATUS FOR ELECTRIC BATHS.
(Application filed Dec. 31, 1897.)
(No Model.)

UNITED STATES PATENT OFFICE.

ANTONIO MAGGIORANI, OF ROME, ITALY.

SPECIAL APPARATUS FOR ELECTRIC BATHS.

SPECIFICATION forming part of Letters Patent No. 647,006, dated April 10, 1900.

Application filed December 31, 1897. Serial No. 665,155. (No model.)

*To all whom it may concern:*

Be it known that I, ANTONIO MAGGIORANI, of Rome, Italy, have invented new and useful Improvements in Electrotherapeutic Apparatus, of which the following is a specification.

The object of the invention is to provide an apparatus for use by physicians in administering electric current to the human body.

The invention comprises features of construction by which the intensity of the current may be nicely graduated according to the desire of the physician.

The several features of novelty of the invention will be included in the claims appended to this specification.

Figure 1:
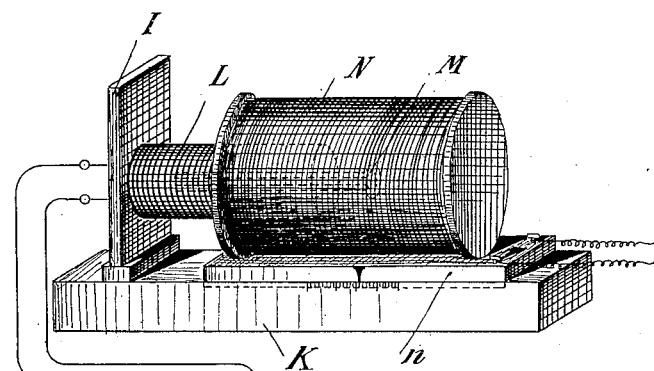
Figure 2:
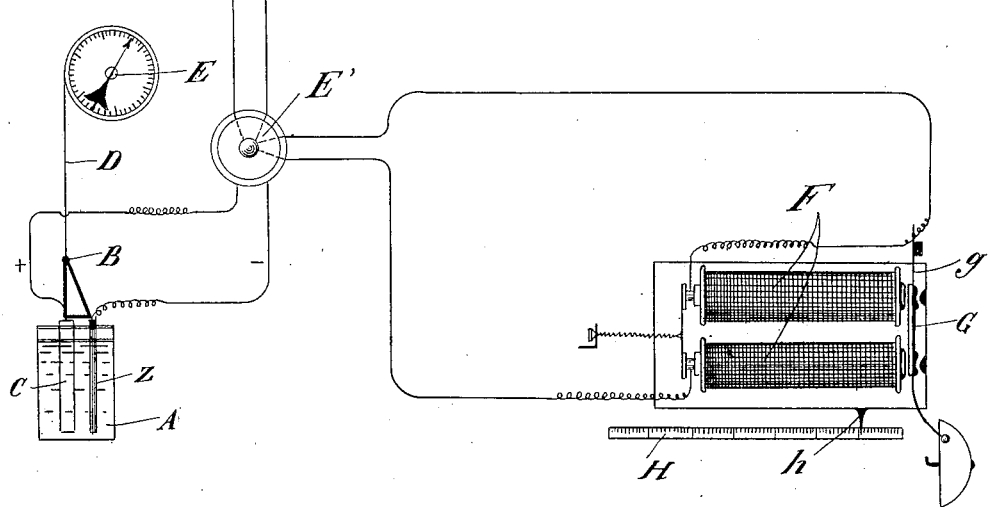
Figure 2:
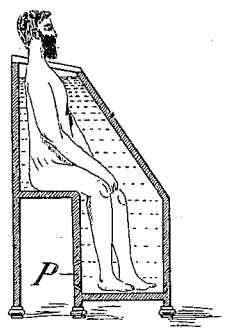

In the accompanying drawings, which illustrate the invention, Figure 1 is a diagrammatic view of an apparatus embodying my improvements, and Fig. 2 is a sectional view of a bath-tub by which the current may be administered to all parts of the body while the patient is in a sitting position.

The apparatus comprises a battery and means for regulating the depth or immersion of the electrodes and a circuit-changer by which the current may be led through a bell or other current-indicator capable of delicate graduation to indicate to the physician the strength of the current and the corresponding adjustment of the battery or through a branch circuit to an induction-coil of special construction, the several parts of which are adjusted to vary the intensity of the induced current.

Referring to the drawings, A represents a galvanic battery provided with copper and zinc electrodes, though of course electrodes of other character may be employed. These electrodes are connected by a cord or other flexible connection D, by which they are suspended from a rotary support E, provided with an index and a graduated scale to indicate the degree of immersion. E' represents a circuit-changer with which the battery-terminals are connected and by which the current may be thrown upon a branch circuit including a bell or another branch circuit including an induction-coil. The bell-coils are mounted so that they can be slid to and fro with relation to an armature G, carrying a bell-hammer in coöperative relation to a bell, as indicated, which serves as an annunciator or indicator. A pointer $h$, secured to the frame which carries the coils, moves over a fixed graduated scale H, which indicates the strength of current required to operate the bell in the several positions of adjustment of the coils. The induction-coil comprises a standard I, upon which is mounted the primary coil L, the terminals of which connect with a branch circuit leading from the circuit-changer E'. Within the primary coils is a bundle of soft-iron wires M, capable of adjustment so as to vary the magnetic effect. A secondary coil N is mounted on a sliding frame $n$, mounted in a base K, so as to be capable of movement, thus permitting the secondary coil to embrace a part or all of the primary. The secondary terminals may be connected with any type of contact-electrodes desired for the administration of the current to the patient. If treatment by fomentation is required, the wires may be carried to a moistened felt or spongy surface applied to the body. If a complete bath is desired, the wires may be led to electrodes or terminals entering the water. A bath-tub of advantageous construction is shown in Fig. 2 especially for cardiapathic treatment, an exhaust-valve P permitting it to be emptied in a short time. The circuit-wires are preferably made of alloy of aluminium and phosphor-bronze or an alloy composed principally of nickel, which does not oxidize and is a good conductor. The apparatus provides for a delicate and precise regulation of the current administered and indicating to the physicians what the strength of the current is. The bell adjustment permits the apparatus to be set so that an oral indication will be given when the current strength reaches a degree shown by the pointer $h$. The battery is then adjusted until the bell rings when set at the strength of current desired.

The index E gives a rough indication as to the strength of the current, but is not invariable on account of changes in the voltage of the battery.

Having thus described my invention, what I claim as new, and desire to secure by Letters Patent, is—

1. An electromedical apparatus comprising a regulable battery, an annunciator or electric bell in circuit therewith provided with a movable core and a graduated index for indicating the strength of the current, in combination with an induction-coil, provided with means for varying the intensity of the secondary current.

2. An electromedical apparatus comprising a battery, means for varying the depth of the electrodes therein, an index showing the approximate current strength corresponding to such depth of immersion, a circuit-changer connected to the battery-terminals and two circuits adapted to be connected therewith alternately, one containing an adjustable bell responsive to different current strengths and the other containing an induction-coil the primary of which is connected with the circuit and contains an adjustable core and the secondary of which is movable with relation to the primary to inclose more or less of the same.

In testimony whereof I have signed my name to this specification in the presence of two subscribing witnesses.

ANTONIO MAGGIORANI.

Witnesses:
W. E. MANTIUS,
D. W. GENELATI.